(12) United States Patent
Mestrallet

(10) Patent No.: US 8,062,902 B2
(45) Date of Patent: Nov. 22, 2011

(54) MAMMALIAN DISEASE DETECTION SYSTEM

(75) Inventor: Francois Mestrallet, Longvie (FR)

(73) Assignee: Nullodor USA LLC

( * ) Notice: Subject to any disclaimer, the term of this patent is extended or adjusted under 35 U.S.C. 154(b) by 129 days.

(21) Appl. No.: 12/394,220

(22) Filed: Feb. 27, 2009

(65) Prior Publication Data

US 2009/0325304 A1 Dec. 31, 2009

Related U.S. Application Data

(60) Provisional application No. 61/032,316, filed on Feb. 28, 2008.

(51) Int. Cl.
*G01N 21/77* (2006.01)
*G01N 21/78* (2006.01)
*G01N 21/80* (2006.01)
*G01N 33/68* (2006.01)
*G01N 33/72* (2006.01)

(52) U.S. Cl. .............. 436/169; 436/66; 436/86; 436/95; 436/97; 436/163; 436/164; 436/166; 422/400; 422/420; 422/425; 119/171

(58) Field of Classification Search .................... 436/63, 436/66, 86, 96, 97, 163, 164, 166, 169, 95; 422/55, 56, 57, 400, 420, 425; 119/171, 119/172

See application file for complete search history.

(56) References Cited

U.S. PATENT DOCUMENTS

| | | | |
|---|---|---|---|
| 3,978,818 A * | 9/1976 | Heldenbrand | 119/170 |
| 5,005,572 A * | 4/1991 | Raemer et al. | 128/207.14 |
| 5,143,023 A * | 9/1992 | Kuhns | 119/173 |
| 5,267,532 A * | 12/1993 | Franklin et al. | 119/173 |
| 5,279,259 A * | 1/1994 | Rice et al. | 119/173 |
| 5,362,633 A * | 11/1994 | Pugia | 435/28 |
| 5,371,054 A * | 12/1994 | Pluta et al. | 502/62 |
| 5,830,765 A * | 11/1998 | Santioemmo et al. | 436/66 |
| 5,970,915 A * | 10/1999 | Schlueter et al. | 119/171 |
| 6,382,132 B1 * | 5/2002 | Steckel et al. | 119/171 |
| 7,485,466 B2 * | 2/2009 | Jenkins et al. | 436/86 |
| 7,670,845 B2 * | 3/2010 | Wenzel et al. | 436/163 |
| 2004/0025798 A1 * | 2/2004 | Lee et al. | 119/172 |
| 2005/0145186 A1 * | 7/2005 | Fung et al. | 119/171 |
| 2006/0270051 A1 * | 11/2006 | Jenkins et al. | 436/86 |

* cited by examiner

*Primary Examiner* — Maureen Wallenhorst
(74) *Attorney, Agent, or Firm* — Belles Katz LLC

(57) ABSTRACT

A mammalian disease detecting system used to provide a visual indication of a possible disease state includes particles made of a material that is substantially clear or transparent to permit the easy visual detection of blood in urine of a mammal. The system also includes additives to permit visually detection of possible disease states or infections in mammals, such additives being of the type that are not reactive with the particular material.

12 Claims, No Drawings

MAMMALIAN DISEASE DETECTION SYSTEM

CROSS-REFERENCE TO RELATED APPLICATIONS

The present application claims the benefit of U.S. Provisional Patent Application No. 61/032316 filed Feb. 28, 2008, the entirety of which is hereby incorporated by reference.

FIELD OF THE INVENTION

The present invention relates generally to a mammalian disease detection system, and more particularly to a system that when exposed to urine detects possible diseases or illness in mammals, and in particular, pets such as felines.

DESCRIPTION OF RELATED ART

Pet litters made from a variety of different materials have been disclosed in the prior art. These litters have including such materials as uncalcined clay (U.S. Pat. No. 5,371,054), as well as a variety of other materials, such as minerals, fly ash, perlite, silicas, other absorbent materials and mixtures thereof (U.S. Publication No. 2006/02700051).

The '051 publication discloses the use of Phloxine B buffered between a pH of 2-2.5 to detect the presence of protein. This additive is too acidic for use in detecting proteins in the present invention. The high acidity can interfere with the proper action of other dyes included in the system of this invention.

A number of patents also disclose that pH indicators can be added to the basic substrate material for the purposes of detecting a change in pH of a mammal's urine. Such changes can be indicative of urinary tract or bladder infections.

Pluta et al., U.S. Pat. No. 5,371,054 discloses the use of uncalcined clay as the substrate in a pet litter product. The pet litter also includes a pH indicator. In addition, the '054 patent discloses the inclusion of additives to detect both liver disease and kidney disease by detecting undesired levels of bilirubin and protein. This patent also discloses the use of other dyes to predict undesired levels of glucose, ketones and urobilinogen.

Additives introduced into the particular material, particular for the purpose of determining high levels of bilirubin and protein, do not work satisfactorily with clays of the type disclosed in the '054 patent Based on the state of the art, a need exists for a mammalian disease detection system for use in detecting a variety of potential diseases based on the make up of the urine of the mammal. Although the present application for the system of this invention is in connection with pet litter, and in particular, feline litter, the compositions of this invention are believed to have much wider applicability, and, in particular as a detection system for detecting possible infections or diseases in humans. It is such an improved system that the present invention relates.

All references cited herein are incorporated herein by reference in their entireties.

SUMMARY OF THE INVENTION

The above and other objects of this invention are achieved in a mammalian disease detection system for use in providing a visual indication of a possible disease state or infection in mammals, said system including particles that are comprised of a material that is substantially clear or transparent to permit the easy visual detection of blood in urine of a mammal, said system further including additives to permit visual detection of possible disease states or infections in mammals other than those associated with blood in the urine, such additives being of the type that are not reactive with the particular material.

Preferably the additives included in the system at least detect undesired levels of bilirubin and protein.

In the preferred embodiment of this invention, the particles are formed of an amorphous silica gel.

Preferably, the silica gel is present in a particle size range of 0.5 to about 6.0 mm; more preferably in the range of 0.5 to about 5.0 mm and most preferably in the range of 0.5 to 2.0 mm.

In another embodiment of this invention, the particles are formed of white paper particles that can be in the same size ranges as stated above with respect to the silica gel but most preferably are in the range of about 3 to about 6 millimeters.

Most preferably the mammalian disease detection system is in the form of a pet litter for detecting possible diseases and illness in animals, such as felines.

DESCRIPTION OF THE PREFERRED EMBODIMENTS OF THE INVENTION

This invention relates to a mammalian disease detection system for use in providing a visual indication of possible disease states or illness in mammals. In particular, the system of this invention is capable of detecting blood in urine, which may be indicative of a urinary tract or bladder infection, and also detecting a high bilirubin content or protein content, which may be indicative of a liver or kidney disease, respectively.

The systems of this invention are effective for detecting possible disease states or illness in mammals, e.g., humans, felines, canines, and rodents, by providing a visual indication of a possible disease state or illness when the system comes in contact with the mammal's urine. Although the present invention broadly can be used with mammals in general, the detailed description which follows will be in connection with an animal litter to be used by common pets, and most preferably by felines.

A very important aspect of this invention is that the particular substrate be sufficiently clear or transparent to permit a clear visible presentation of any blood present in the urine.

In addition, additives are included in the substrate to cause a change in color of the system to indicate a possible disease state or illness of the animal. These additives and possible disease states or illnesses will be described in detail hereinafter.

It is also important that the particulate material of the substrate be substantially neutral in pH, and therefore, particles formed of clay or other acid or alkaline substances are not within the scope of the present invention.

It is extremely important that the particulate material be selected so that it is non-reactive with the additives that are introduced for the purpose of indicating a possible disease state or illness, as will be describing in greater detail hereinafter. If the particulate material were reactive with such additives such a reaction could provide false negative or false positive results.

Within the broadest aspect of this invention the particulate material can be in the size range generally employed in current litter products. Preferably, the particles are in a size range of 0.5 to 6 mm, more preferably in the range of 0.5 to 5 mm, and most preferably in the range of 0.5 to 2 mm. Applicant has found that the smallest size range, which is not included in prior art litter products, provides the best visual indication of blood in the urine, and also a very clear visual indication of changes in color provided by other additives to indicate other possible disease states or illness, as will be described in greater detail hereinafter.

In accordance with the invention, the most preferred particulate material employed in this invention is amorphous silica; however, reasonably good results have been obtained by using particulate white paper as the substrate.

Although the most preferred particulate material is amorphous silica with over 90% of the particles being approximately 0.5 mm it is within the broad scope of this invention to utilize regular silica cat litter either in pearls or lumpy.

As stated earlier, various additives are included in the detection system of this invention, and will now be described in greater detail.

Specifically, the particulate material employed in this invention is mixed or blended with a chemical pH indicator that provides a visible indication of pH change. A preferred pH indicator gives a color scale in the range of a pH between 1 and 13, said scale going from a color of orange to blue green by using Bromothymol Blue (dibromothymolsulfonphthalein).

Other pH indicators usable in this invention preferably change colors over a pH range from about 3 to about 10 and more preferably in the range of from about 5 to about 9. The choice of the particular indicator will depend on the desired end use. For example, an indicator that changes color in the pH range of 7 and 8 can be used for a clumping cat litter by the typical pet owner. This gives the owner an early warning of the onset of a bladder infection, bladder stones/crystals, sterile cystitis (inflammation of the bladder not due to bacteria or virus) and other urinary tract problems including Feline Urological Syndrome (FUS), also known as Feline Lower Urinary Tract Disease (FLUTD).

Other dyes can be used on products for veterinarians as a more precise indicator of urine pH. Such dyes include bromocresol purple, which yields progressive color variation over the pH range of 5 to 9. This enables veterinarians to more accurately determine the pH level of an animal's urinary discharge. It should be understood that other dyes can be added in addition to pH indicators to predict levels of other elements, such as glucose, nitrates, ketones, bilirubin, urobilinogen and protein.

Dyes that provide an indication of abnormal protein and bilirubin levels are a predictor of kidney and liver diseases, respectively, such as such as nephropathy and renal arnyloidosis.

Dyes that provide an indication of abnormal glucose and ketone levels are a predictor of diabetes.

Dyes that provide an indication of abnormal levels of nitrates are a predictor of some bladder infections. Detection of blood in the urine can be a predictor of bladder infection, bladder stones/crystals, sterile cystitis (inflammation of the bladder not due to bacteria or virus).

In the most preferred embodiments, the following additives are included to detect the indicated substance:

Glucose: 2.2% w/w Glucose Oxidase (Microbial, 1.3 IU) (*Aspergillus Niger*, 1,3 IU); 0.6% p/p de peroxydase (raifort, 3300 UI); 7.0% p/p potassium Iodide; 76.1% p/p w/w Nonreactive Ingredients.

Nitrate: 1.4% w/w P-Arsanilic Acid 97.3% w/w Buffer, 2.4% w/w Nonreactive Ingredients.

Urobilinogen: 0.2% w/w P-Diethylaminobenzaldehyde 97.0% w/w Nonreactive Ingredients.

Protein: 0.3% w/w Tetrabromphenol Blue 92.9% w/w Buffer. Specific Gravity: 2.8% w/w Bromothymol Blue 86.5% w/w Nonreactive Ingredients.

Leukocytes: 0.4% w/w Derivatized Pyrrole Amino Acid Ester 8.1% w/w Potassium Iodide 28.4% w/w Sodium Hydroxide.

Blood: 6.8% w/w Diisopropylbenzene Dihydroperoxide 18.9% w/w Nonreactive Ingredients.

Bilirubin: 0.4% w/w 2, 4-Dichloroaniline Diazorium Salt 1.0% w/w Peroxidase (Horseradish 3300 IU) 1.3% w/w 1, 2, 3, 4-Tetrahydrobenzo (h) quinolin-3-ol 10.8% w/w Buffer.

A variety of other chemical indicators can be employed in the system of this invention. These indicators include, but are not limited to, phenol red (phenolsulfonphthalein), cresol red (o-cresolsulfonphthalein), bromcresol purple (dibromo-o-cresolsulfonphthalein), p-bromobenzenesulfonyl chloride, Congo red (diphenyldiazo-bis-1-naphthylarnine-4-sodium sulfonate), methyl orange (sodium salt of dimethylaminoazobenzenesulfonic acid), bromchlorphenol blue (dibromodichlorophenolsulfonphthalein), P-ethoxychrysoidine (4'-ethoxy-2,4-diaminoazobenzene), naphthyl red (naphthylaminoazobenzene), bromcresol green (tetrabromo-m-cresolsulfonphthalein), methyl red (dimethylaminoazobenzene-P-carboxylic acid), lacmoid, litmus, chlorphenol red (dichlorophenolsulfonphthalein), benzoyl suramine G, azolitmin, bromphenol red (dibromophenolsulfonphthalein), ibromophenoltetrabromophenosulfonphthalein, neutral red (amino-dimethylamino-toluphenalin-hydrochloride), rosolic acid aurin (corallin), quinoline blue (cyanine), a-naphthlophthalein, metacresol purple (m-cresolsulfonphthalein), ethyl bis-[2,4-dinitrophenyl] acetate, Tropeolin 000 (a-Naphtol orange, a-naphthlolazobenzenepsulfonic acid), thymol blue (thymolsulfonphthalein), o-cresolphthalein, thymolphthalein, Nile blue (aminodiethylaminonaphthophenazoxoniumchloride). Curcumin (Brilliant yellow, sulfanilic acid-azodiphenylarninosulfonic acid), dimethylaminoazobenzene (dimethyl yellow, methyl yellow, butter yellow), Metanil yellow (Victoria yellow, Metanil extra, Tropeolin G, sodium salt of diphenylaminoazo-m-benzenesulfonic acid), Methyl Violet 6B (pentamethylbenzylpararosaniline-hydrochloride), p-Naphtholbenzene, Resazurin, Tropeolin 00 (Orange IV, Aniline Yellow, Diphenyl Orange, sodium salt of diphenylaminoazo-p-benzenesulfonic acid), xylenol blue (p-xylenonlsulfonephthalein) and mixtures thereof.

The various chemical pH indicators, also referred to herein as "dyes," can be used in their acid, neutral (anhydride) or salt forms. Bromothymol blue, phenol red and bromocresol purple are preferred dyes. Mixtures of two or more dyes may be used but non-mixtures (single dyes) are preferred. The dye is typically applied to the particulate substrate of this invention as a solution (including dispersions, suspensions, etc.). Solvents useful for this purpose include water and organic solvents such as alcohols and ketones; preferred organic solvents are those which are water miscible. In the case of acid or neutral indicators, it is preferable to form a concentrate of said indicator in a non-aqueous, water miscible solvent, such as ethanol, methanol and acetone, which is then mixed with water for application to said clay substrate. With salt forms of the dyes, the solvent is water, The preferred salt form of the dyes is the sodium salt. With sodium salt forms of the dyes, solution in water is possible. The acid forms may be solubilized by first making a 0.05-0.10 wt. % solution of sodium hydroxide or sodium carbonate and then adding the acid form to this solution. Dye solutions can be applied to the silica or paper particulate material by coating methods, such as spraying, known to those of ordinary skill in the art. A suitable method involves spraying atomized droplets of a dye solution directly onto a cascade of silica or paper particles as those particles fall through the spraying chamber. The dyes are typically applied in 0.2-0.5 wt % solutions to the particulate substrates. The amount of dye contained in the particulate substrate composition of this invention is preferably from about 0.005% up about to 0.05% by weight of the composition, more preferably from about 0.01% up to about 0.03%. Dye concentrations in the solution and the amount of solution sprayed onto the particulate material can be varied in order to control the free-moisture content of the compositions of this invention. The desired free-moisture content of the compositions of this invention ranges from about 15% up to about 30% by weight most preferably about 20%.

As previously mentioned, these compositions are particularly useful as litters for the accumulation of animal urine. In addition to providing stronger and sharper color distinctions between pHs over the desired pH range, improved color stability and effective agglomeration, the compositions do not require the addition of (i) binders for agglomeration, (ii) pH pre-adjustment of substrate surface, (iii) heating of dye solutions to achieve solubility of water soluble dyes, or (iv) other additives. The initial colors generated by wetted areas of the compositions of the instant invention may fade and lose color over a period of time (usually hours). However, the initial indicated colors can be reconstituted by wetting the previously wetted area with a few drops of distilled water; an advantageous property of the claimed compositions.

Most preferably the additives are in the form of a buffer solution to increase the stability and lasting effect of the product. While the invention has been described in detail and with reference to specific examples thereof, it will be apparent to one skilled in the art that various changes and modifications can be made therein without departing from the spirit and scope thereof.

What is claimed is:

1. A mammalian disease detecting system for use in providing a visual indication of a possible disease state or illness in mammals comprising:
   silica gel particles comprising additives, the additives including 1,2,3,4-Tetrahydrobenzo (h) quinolin-3-ol to detect Bilirubin and at least one of the following additives: (1) Bromothymol Blue to detect pH; (2) Diisopropylbenzene Dihydroperoxide to detect Blood; (3) Tetrabromphenol Blue to detect Protein; and (4) Glucose Oxidase to detect Glucose.

2. The mammalian disease detecting system of claim 1 wherein the silica gel particles have a substantially clear or transparent color and have a size or about 0.5-2 millimeters.

3. The mammalian disease detecting, system of claim 1 wherein the at least one additive is Diisopropylbenzene Dihydroperoxide at a concentration of 6.8% by weight.

4. The mammalian disease detecting system of claim 1 wherein the at least one additive is Tetrabromphenol Blue at a concentration of 0.3% by weight.

5. The mammalian disease detecting system of claim 1 wherein the additive 1,2,3,4-Tetrahydrobenzo (h) quinolin-3-ol is at a concentration of 1.3% by weight.

6. The mammalian disease detecting system of claim 1 wherein the at least one additive is Glucose Oxidase at a concentration of 2.2% by weight.

7. A mammalian disease detecting system for use in providing a visual indication of a possible disease state or illness in mammals comprising:
   silica gel particles comprising additives, the additives including 1 2,3,4-Tetrahydrobenzo (h) quinolin-3-ol to detect Bilirubin and at least two of the following additives: (1) Bromothymol Blue to detect pH; (2) Diisopropylbenzene Dihydroperoxide to detect Blood; (3) Tetrabromphenol Blue to detect Protein; and (4) Glucose Oxidase to detect Glucose.

8. The mammalian disease detecting, system of claim 7 wherein the silica gel particles have a substantially clear or transparent color and have a size of about 0.5-2 millimeters.

9. The mammalian disease detecting system of claim 7 wherein the at least two additives are Diisopropylbenzene Dihydroperoxide at a concentration of 6.8% by weight, and Tetrabromphenol Blue at a concentration of 0.3% by weight.

10. The mammalian disease detecting system of claim 7 wherein the at least two additives are Tetrabromphenol Blue at a concentration of 0.3% by weight, and Glucose Oxidase at a concentration 2.2% by weight.

11. The mammalian disease detecting system of claim 7 wherein the at least two additives are Tetrabromphenol Blue at a concentration of 0.3% by weight, and Bromothymol Blue to detect pH.

12. The mammalian disease detecting system of claim 7 wherein the at least two additives are Diisopropylbenzene Dihydroperoxide at a concentration of 6.8% by weight, and Bromothymol Blue to detect pH.

* * * * *